United States Patent
Meredith et al.

(10) Patent No.: US 9,473,889 B2
(45) Date of Patent: *Oct. 18, 2016

(54) METHOD AND APPARATUS FOR DETERMINING A PROBABILITY FOR A GEO-FENCE

(71) Applicant: AT&T Mobility II LLC, Atlanta, GA (US)

(72) Inventors: Sheldon Kent Meredith, Marietta, GA (US); Jeremy Fix, Acworth, GA (US); Mario Kosseifi, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,945

(22) Filed: Aug. 24, 2015

(65) Prior Publication Data

US 2015/0365797 A1 Dec. 17, 2015

Related U.S. Application Data

(63) Continuation of application No. 14/086,941, filed on Nov. 21, 2013, now Pat. No. 9,119,034.

(51) Int. Cl.
*H04W 4/02* (2009.01)
*H04W 8/02* (2009.01)

(52) U.S. Cl.
CPC ............... *H04W 4/021* (2013.01); *H04W 8/02* (2013.01)

(58) Field of Classification Search
CPC ...... H04W 4/028; H04W 4/021; H04W 8/02
USPC ......... 455/456.1, 456.2, 456.3, 456.5, 456.6, 455/404.2; 340/539.13
See application file for complete search history.

(56) References Cited

U.S. PATENT DOCUMENTS

| | | | |
|---|---|---|---|
| 7,657,269 B2 | 2/2010 | Suryanarayana et al. |
| 7,783,303 B1 | 8/2010 | Lerner et al. |
| 7,865,194 B2 | 1/2011 | Roskowski |
| 7,973,707 B2 | 7/2011 | Verechtchiagine |
| 8,125,332 B2 | 2/2012 | Curran et al. |
| 8,391,889 B2 | 3/2013 | Marti et al. |
| 8,489,127 B2 | 7/2013 | Huang et al. |
| 8,626,187 B2 | 1/2014 | Grosman et al. |

(Continued)

OTHER PUBLICATIONS

Namiot, Dmitry, and Manfred Sneps-Sneppe. "Geofence and Network Proximity." *arXiv preprint arXiv:1303.5943* (2013).

*Primary Examiner* — Cong Tran

(57) ABSTRACT

A method, computer-readable storage device, and an apparatus for determining a probability for a particular geo-fence in a wireless network are disclosed. For example, the method receives a mobile identification, a location record, and an accuracy level, identifies a bin in a database of record, identifies one or more geo-fences in which the bin is located, identifies one or more geo-fences that are pre-associated with the mobile user endpoint device, determines an intersection of: the one or more geo-fences that are identified as being pre-associated with the user endpoint device, and the one or more geo-fences that are identified as being geo-fences in which the bin is located, and determines for each particular geo-fence in the intersection, the probability of being in the particular geo-fence, wherein the probability of being in the particular geo-fence is determined in accordance with the accuracy level associated with the location record.

20 Claims, 4 Drawing Sheets

(56) References Cited

U.S. PATENT DOCUMENTS

| | | |
|---|---|---|
| 8,750,895 B2 | 6/2014 | Grosman et al. |
| 8,880,101 B2 | 11/2014 | Fraccaroli |
| 2003/0188029 A1 | 10/2003 | Shafran et al. |
| 2012/0002563 A1 | 1/2012 | Flanagan |
| 2012/0307645 A1 | 12/2012 | Grosman et al. |
| 2013/0231137 A1 | 9/2013 | Hugie et al. |
| 2013/0244687 A1 | 9/2013 | Stargardt et al. |
| 2013/0295969 A1 | 11/2013 | Sheshadri et al. |
| 2013/0295970 A1 | 11/2013 | Sheshadri et al. |
| 2014/0045516 A1 | 2/2014 | Turgman et al. |
| 2014/0164118 A1 | 6/2014 | Polachi |
| 2014/0370911 A1 | 12/2014 | Gorgenyi et al. |

METHOD AND APPARATUS FOR DETERMINING A PROBABILITY FOR A GEO-FENCE

This application is a continuation of U.S. patent application Ser. No. 14/086,941, filed Nov. 21, 2013, now U.S. Pat. No. 9,119,034, which is herein incorporated by reference in its entirety.

BACKGROUND

A network service provider may wish to have accurate knowledge of the locations of its customers. For example, a customer may interact with the service provider via a base station that customer's endpoint device is using to obtain a service. Since the wireless coverage in the vicinity of the customer depends on the proximity of the customer's endpoint device to the cell tower, a geo-fence may be defined for an area considered to be inside the coverage area of the cell tower. Unfortunately, using the coverage area associated with the cell tower to define a geo-fence does not produce accurate results.

SUMMARY OF THE DISCLOSURE

In one embodiment, the present disclosure describes a method, computer-readable storage device, and apparatus for determining a probability for a particular geo-fence in a wireless network. For example, the method receives a mobile identification for a mobile user endpoint device, a location record for the mobile user endpoint device, and an accuracy level associated with the location record of the mobile user endpoint device, identifies a bin in a database of record, using the location record that is received for the mobile user endpoint device, identifies one or more geo-fences in which the bin is located using the bin that is identified as an index, identifies one or more geo-fences that are pre-associated with the mobile user endpoint device, using the mobile identification, determines an intersection of: the one or more geo-fences that are identified as being pre-associated with the user endpoint device, and the one or more geo-fences that are identified as being geo-fences in which the bin is located, and determines for each particular geo-fence in the intersection that is determined, the probability of being in the particular geo-fence, wherein the probability of being in the particular geo-fence is determined in accordance with the accuracy level associated with the location record of the mobile user endpoint device.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates generally to determining a probability for a geographical fence (geo-fence) and, more particularly, to a method, computer-readable storage device, and apparatus for determining a probability for a geo-fence in a wireless network, e.g., in a long term evolution (LTE) based wireless network. Although the teachings of the present disclosure are discussed below in the context of a long term evolution (LTE) based wireless network, the teaching is not so limited. Namely, the teachings of the present disclosure can be applied for customers of other types of wireless networks (e.g., 2G network, 3G network, 4G network and the like), wherein determination of the probability of a geo-fence collision may be beneficial.

Broadly defined, 3GPP is a global effort to define a wireless communication system specification. 2G is a second generation cellular network technology, 3G is a third generation cellular network technology, and 4G is a fourth generation cellular network technology. A Global System for Mobile (GSM) communications is an example of a 2G cellular technology and a Universal Mobile Telecommunications System (UMTS) is an example of a 3G cellular network technology. In accordance with the 3GPP global effort, a General Packet Radio Service (GPRS) refers to a communications service used to transfer data via a cellular network. GPRS is available to users of a 2G cellular system GSM. The GPRS provides an enhancement to the GSM system so that data packets are supported. In addition, in 3GPP release 8, an LTE is provided as a set of enhancements to the UMTS. The enhancement focuses on adopting 4th Generation (4G) mobile communications technology to include an all Internet Protocol (IP) end-to-end networking architecture. An LTE is an example of a 4G cellular network technology.

A base station for a 2G network is also referred to as a base transceiver station (BTS). A base station in a 3G network is also referred to as a Node B. For the 4G network, a radio base transceiver station (RBS), as per the 3GPP standards, is referred to as an eNodeB (or simply as a base station). An eNodeB provides an LTE—air interface and performs radio resource management for wireless access.

In one embodiment, a Serving GPRS Support Node (SGSN) refers to a network node responsible for communicating with user endpoint devices and routing of data calls. For example, the SGSN may send and receive data packets to and from user endpoint devices in the coverage area of the SGSN.

In one embodiment, a Gateway GPRS Support Node (GGSN) refers to a network node responsible for the interworking between the GPRS network and external packet switched networks, e.g., the Internet. The GGSN converts the GPRS packets coming from the SGSN into the packet data protocol (PDP) format of the external packet network. For example, the GPRS packet may be converted to an Internet Protocol packet prior to being sent to the external network, which is Internet Protocol based.

Figure 1:
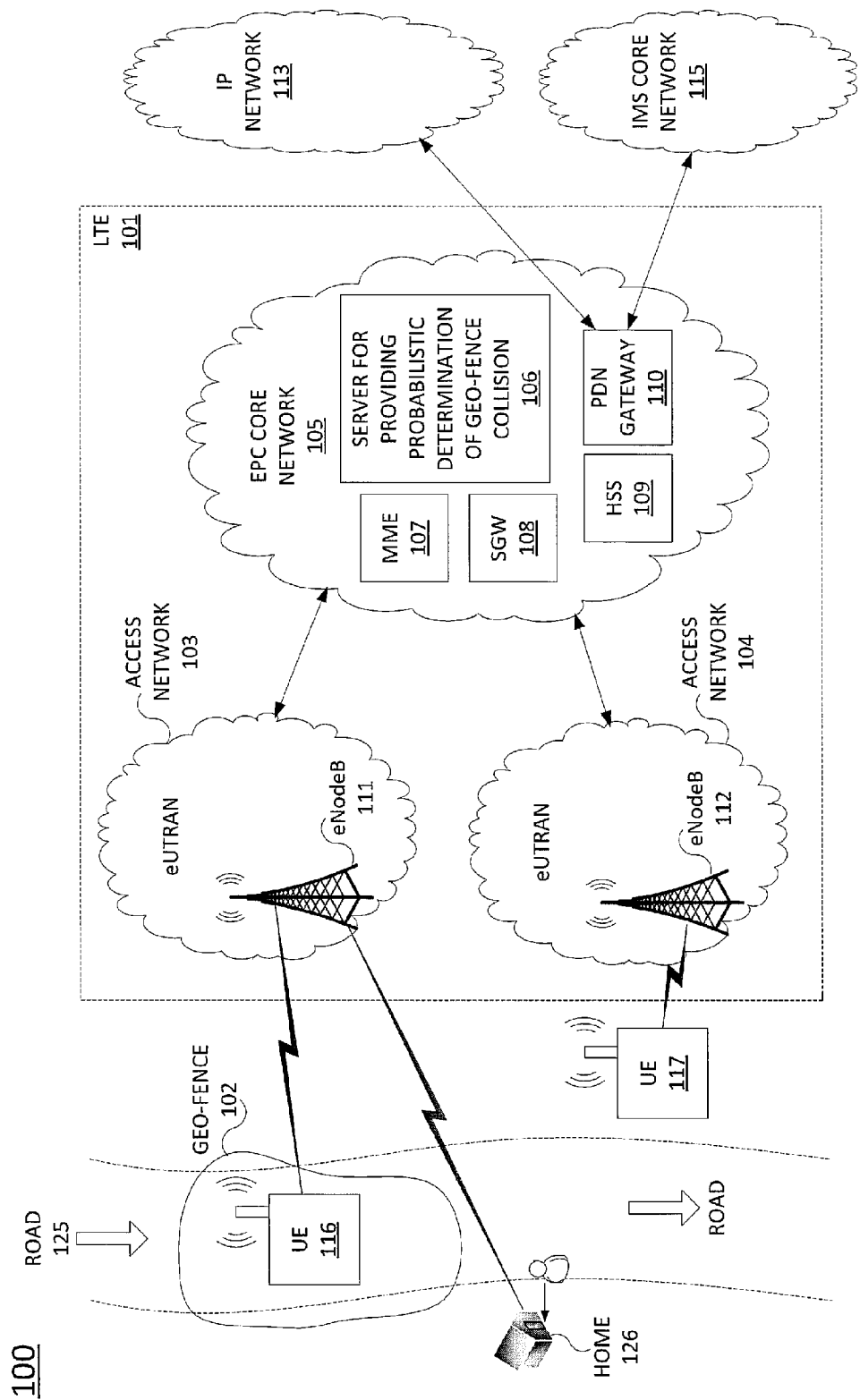
FIG. 1 illustrates an exemplary network related to the present disclosure.

FIG. 1 illustrates an exemplary network 100 related to the present disclosure. In one illustrative embodiment, the network 100 comprises an LTE network 101, an IP network 113, and a core network, e.g., an IMS core network 115. FIG. 1 also illustrates various user endpoint devices, e.g., LTE user endpoint devices 116 and 117. The user endpoint devices 116 and 117 can be a smart phone, a cellular phone, a computer or laptop, a computing tablet, or any endpoint communication devices equipped with wireless capabilities.

In one illustrative embodiment, the LTE network 101 comprises access networks 103 and 104 and a core network 105. In one example, each of the access networks 103 and 104 comprises an evolved Universal Terrestrial Radio Access Network (eUTRAN). In one example, the core network 105 comprises an Evolved Packet Core (EPC) network.

The eUTRANs are the air interfaces of the 3GPP's LTE specifications for mobile networks. Namely, the eUTRAN comprises a radio access network standard that will replace previous generations of air interface standards. All eNodeBs in the eUTRANs 103 and 104 are in communication with the EPC network 105. In operation, LTE user equipment or user endpoint (UE) 116 may access wireless services via the eNodeB 111 located in the eUTRAN 103. Similarly, the LTE UE 117 may access wireless services via the eNodeB 112 located in the eUTRAN 104.

It should be noted that any number of eNodeBs can be deployed in an eUTRAN. In one illustrative example, the eUTRANs 103 and 104 may comprise one or more eNodeBs.

An EPC network provides various functions that support wireless services in the LTE environment. In one embodiment, an EPC network is an Internet Protocol (IP) packet core network that supports both real-time and non-real-time service delivery across a LTE network, e.g., as specified by the 3GPP standards.

In EPC network 105, a server 106 (e.g., an application server) for providing a probabilistic determination of geo-fence collision, a network device Mobility Management Entity (MME) 107, and a Serving Gateway (SGW) 108, support various functions as part of the LTE network 101. For example, customers accessing services via UEs 116 and 117 may receive geo-fence collision and probability information from server 106 of the service provider. The MME 107 is the control node for the LTE access-network. In one embodiment, it is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a public data network gateway 110 which serves as a gateway that provides access between the EPC network 105 and various data networks, e.g., other IP networks 113, an IMS core network 115, a network management system and the like. The public data network (PDN) gateway is also referred to as a PDN gateway, a PDN GW or a PGW.

It should be noted that although various networks are shown as separate networks in FIG. 1, it is possible that functions performed by these networks can be combined into fewer networks or expanded into a greater number of networks depending on the deployment requirements.

It should also be noted that the above illustrated network 100 is only illustrative and the number of network components or elements are not specifically limited as shown. Any number of network components or elements can be deployed.

As described above, the wireless coverage in the vicinity of the customer depends on the proximity of the customer's endpoint device to the cell towers. One approach is to define geo-fences for areas being considered to be inside the coverage areas of cell towers. The service provider may then make a determination as to whether the customer is considered to be "in" or "out" of a particular geo-fence, when the customer's endpoint device is interacting with the service provider's cell towers. However, such reporting method can be quite inaccurate, e.g., reporting that a customer's current location is within a geo-fence, when in fact the actual location of the customer's endpoint device is outside the geo-fence. This inaccuracy is due to the fact that the boundary of a geo-fence is poorly correlated to the boundary of the coverage area.

For example, a business may provide wireless-fidelity (Wi-Fi) access to its customers within the premises of the business. However, a mobile device user who is near the business may still be able to use the Wi-Fi access, even though he/she is not inside the premises of the business. Thus, using the Wi-Fi access coverage area to determine whether a user of the Wi-Fi access is within the premises of the business defined as a geo-fence would result in many false positives and negatives.

Given such inaccuracy, the service provider may benefit from the knowledge of the probability of the actual location of a customer being within the geo-fence, when the reported location is within the geo-fence. When the service provider makes a claim that the customer endpoint device is inside the geo-fence, knowledge of the probabilities enables the service provider to make accurate claims. For example, in FIG. 1, the UE 116 is located in a central region of a geo-fence 102 while the user of the UE 116 is driving on a road 125. As the user of the UE 116 approaches a home 126 (nearing the edge of the geo-fence 102), the probability of being in the geo-fence 102 decreases. In other words, the quality of the claims pertaining to whether a reported location of the UE 116 is in or out of a particular geo-fence can be quantified.

In one embodiment, the present disclosure provides a probabilistic determination of geo-fence collision in a wireless network. For example, the method determines whether a customer is in or out of particular geo-fences. The method also provides probabilities for each determination that is made. In one embodiment, the service provider provides wireless services to the customer that is priced in accordance with the probabilities associated with the geo-fences serving the customer.

In one embodiment, the method of the present disclosure is implemented via a system that comprises: a subsystem for creating or defining geo-fences, a subsystem for locating mobile endpoint devices, and a subsystem for determining geo-fence collisions, in a wireless network. The subsystem for determining the geo-fence collision also provides probabilities of the mobile endpoint device being within the geo-fence. The method of the present disclosure may be implemented for a wireless network that requires determination of the geo-fence collisions and probabilities in a high speed and high volume processing environment, e.g., for networks with a large number of locations being reported in a short duration of time. For example, the number of geo-fences for a wireless network may be on the order of millions and the number of location records to be processed may be several hundred thousand records per second. In addition, the location records may need to be processed in real time, e.g., in less than 10 seconds or so.

The method first defines the geo-fences via the above subsystem for creating the geo-fences. The defining of the geo-fences is such that computations that take significant amount of computational resources are initially performed once and then stored. In turn, when computations in real time are subsequently required, such computations for processing of received locations at high volume and speed can then be accomplished with minimal computer resources.

In one embodiment, the method creates the geo-fences via Tessellation. Tessellation refers to a technique for dividing up a geographical area into tiles or bins. In one embodiment, the present disclosure uses a standard Tessellation technique known as a Military Grid Reference System (MGRS). The present disclosure is described below using the MGRS. However, any other standard Tessellation techniques may be used for implementing the method of the present disclosure.

The present method uses the MGRS Tessellation technique to determine all bins having centers within each geo-fence. The center of a geo-fence may be defined assuming that the geo-fence is shaped like a circle, a polygon, etc. The method then stores in a database a list of bins within each geo-fence.

The method then creates, for each particular bin in the list of bins, a list of geo-fences that the particular bin is within. For example, a particular bin may be in a plurality of geo-fences, e.g., in a first geo-fence encompassing a business location, in a second geo-fence encompassing a neighborhood, in a third geo-fence encompassing a township, in a fourth geo-fence encompassing a state, in a fifth geo-fence encompassing a country, and so on. The method then stores in the database a list of geo-fences for each bin. It is important to note that each of the geo-fences in which the bin is located may refer to the same bin using a unique identifier.

When location records of customers are received, the location records may be expressed in terms of a physical latitudinal and longitudinal location of the user endpoint device. The location records may have varying accuracy level or parameter. For instance, a geo-fence that is small, e.g., on the order or a few hundred meters, may have a location accuracy of 10 m or less in some cases, or as large as a kilometer in other cases of a large geo-fence. The accuracy level may be significant for asserting the probability of the actual location of a user endpoint device being within a geo-fence.

For example, if the earth is divided into two geo-fences: one for northern hemisphere and another for southern hemisphere, the equator may be used as the boundary between the two geo-fences. Then, if the location record indicates a location that is directly on the equator, irrespective of accuracy, the location has a 50% chance of being in the geo-fence of the northern hemisphere. If the location record indicates that the location is centered 100 m north of the equator, the accuracy level becomes significant for asserting the probability of the location being in the geo-fence of the northern hemisphere. In a first example, if the error on the location is such that the standard deviation is 10 m, the probability of the reported location being in the geo-fence of the northern hemisphere is virtually 100% (for practical applications). In a second example, if the error on the location is such that the standard deviation is large, e.g., 1 km, the probability of the reported location being in the geo-fence of the northern hemisphere may be much smaller, e.g., 70%.

As the above exemplary scenario shows, if the accuracy level of the location is low, simply determining whether a customer is "in" or "out" of a geo-fence may not provide enough information to ascertain the actual location of the customer. The negative effect is that the customer may quickly become dissatisfied with the lack of accuracy of the location service. The present method advantageously enables the service provider to determine the probability of the actual location of the customer being in the geo-fence when a reported location for the customer is determined as being in the geo-fence.

In one embodiment, in order to provide the probabilities in real time for processing a high volume of location records, the method of the present disclosure, pre-computes the probabilities of being within one or more particular geo-fences as a function of the accuracy level, and stores the results in a database. Then, in real-time, the method determines the probability of being in a particular geo-fence by simply looking up in the database based on the location accuracy.

Figure 2:
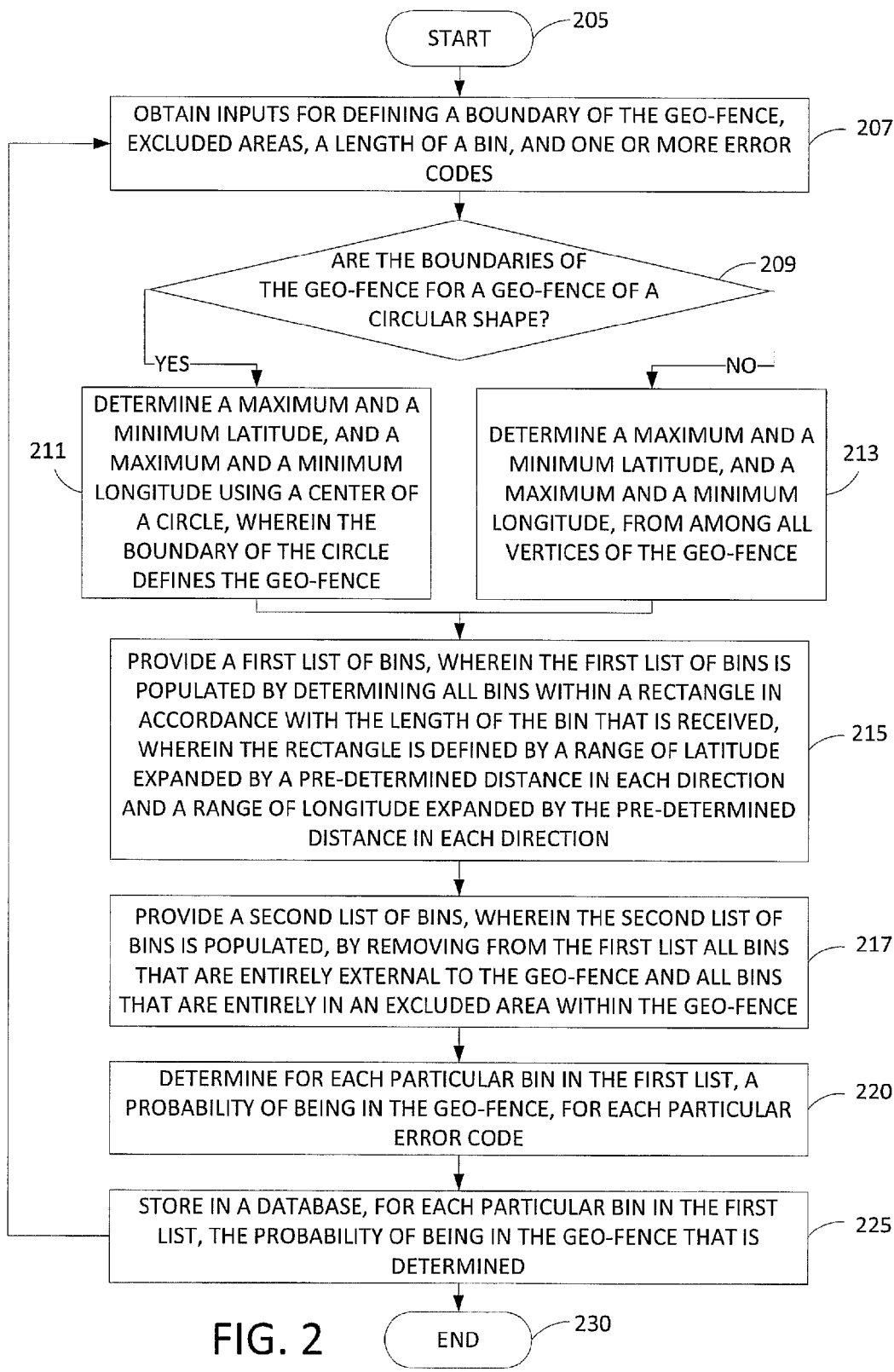
FIG. 2 illustrates a method of the present disclosure for pre-computing the probability of being within a particular geo-fence, when a location is reported as being in a bin associated with the geo-fence.

FIG. 2 illustrates a method 200 of the present disclosure for pre-computing the probability of being within a particular geo-fence, when a location is reported as being in a bin associated with the geo-fence. The method can be implemented in the application server 106 or a general purpose computer as described below. Method 200 starts in step 205 and proceeds to step 207.

In step 207, method 200 obtains inputs for defining, e.g., a boundary for each geo-fence, excluded areas, a length of a bin, and one or more error codes with each error code corresponding to an amount of error measured in distance (broadly an accuracy level), e.g., in a number of meters. For example, the method receives boundaries for defining the particular geo-fence and for setting a length for each bin, e.g., for each MGRS bin.

In step 209, method 200 determines if the boundaries of the geo-fence are for a geo-fence of a circular shape. If the geo-fence is of a circular shape, the method proceeds to step 211. Otherwise, the method proceeds to step 213.

In step 211, method 200 determines a maximum and a minimum latitude, and a maximum and a minimum longitude using a center of a circle, wherein the boundary of the circle defines the geo-fence. The method then proceeds to step 215.

In step 213, method 200 determines a maximum and a minimum latitude, and a maximum and a minimum longitude, from among all vertices of the geo-fence. The method then proceeds to step 215.

In step 215, method 200 provides a first list of bins, wherein the first list of bins is populated by determining all bins within a rectangle in accordance with the length of the bin that is received, wherein the rectangle is defined by a range of latitude expanded by a pre-determined distance in each direction and a range of longitude expanded by the pre-determined distance in each direction. For example, each of the four sides of the rectangle may be expanded by the pre-determined distance, e.g., by 100 m. The bins within the rectangle may then be provided in the first list.

In step 217, method 200 provides a second list of bins, wherein the second list of bins is populated, by removing from the first list all bins that are entirely external to the geo-fence and all bins that are entirely in an excluded area within the geo-fence. For example, if the geo-fence is defined for an area with a pond, and the area comprising the pond is excluded, the method removes bins that are entirely falling within the excluded area.

In step 220, method 200 determines for each particular bin in the first list, a probability of being in the geo-fence, for each particular error code. For example, if there are n error codes, the probability of being in the geo-fence when a location is reported as being in the particular bin in the first list, is determined for each of the n error codes.

In one embodiment, the method determines the probability of being in the geo-fence as a summation of probabilities, wherein the summation is performed over all bins in the second list. For example, each bin in the geo-fence that is not excluded contributes towards the probability computations for other bins inside the geo-fence.

In one embodiment, the probability of being in the geo-fence is computed as the summation in accordance with the equation defined below:

Let, G(BIN,EC) represent the Probability of being in the geo-fence for bin of interest (BIN) for an error code (EC). Then, G(BIN,EC) may be represented as a summation of contributions towards the probability of the BIN from each bin in the second list. For ease of reference, the particular bin the probability contribution is being computed may be referred to as Bin To Accumulate (BTA). Each BTA is then a bin from the second list, and the summation is performed over BTAs that comprise all bins in the second list Then, mathematically G(BIN,EC) is computed as follows:

$$G(BIN, EC) = \Sigma_{\forall BTA \in second\ list} F(BTA), \quad (1)$$

Wherein, $$F(BTA) = \frac{E \times A^2}{\pi((C+0.5A)^2 - (C-0.5A)^2)},$$

$$E = \begin{cases} Erf(0) - Erf\left(-\frac{0.525 \times \frac{A}{B}}{\sqrt{2}}\right), & \text{for } D = 0 \\ Erf\left(-\frac{\left(D - 0.525\frac{A}{B}\right)}{\sqrt{2}}\right) - Erf\left(-\frac{\left(D + 0.525\frac{A}{B}\right)}{\sqrt{2}}\right), & \text{for } D \neq 0 \end{cases}$$

Erf is a Gaussian error function,
D=Gaussian distance from BTA to $$BIN = 1.05\frac{C}{B},$$

C=Distance in meters between the BTA and the BIN,
B=Error code in meters,
A=Bin length.

In one embodiment, bins outside of the geo-fence that are located within a pre-determined distance from the boundary of the geo-fence, also contribute towards the probability computations of bins that are located inside the geo-fence. For example, bins within 20% of the range of latitudinal and longitudinal coordinates may contribute.

In step 225, method 200 stores in a database, for each particular bin in the first list, the probability of being in the geo-fence that is determined in step 220, for each particular error code. For example, if there are 10 bins in the first list with each of the 10 bins having two error codes, and there is one geo-fence, the method computes and stores 20 probabilities of the actual location of the endpoint device being in the geo-fence. Each probability is computed for a combination of one particular bin in which a location may be reported by the user endpoint device and one particular error code for the location that may be reported. The method proceeds to either step 230 to end the pre-computing of the probabilities of being within particular geo-fences, or to return to step 207.

Once the database is populated with the probabilities for all geo-fences, the method may then operate in real time to retrieve the probabilities of being in particular geo-fences (e.g., during processing of a received location of a user endpoint device). In other words, the stored information can be used to assist a location service to determine whether a reported location of a customer endpoint device is within a particular geo-fence.

As described above, the real time processing is based on a received location of a mobile user or customer endpoint device. In some scenarios, the user may frequently travel with the user endpoint device among a limited set of locations. For example, a user may be traveling to a particular work address, to a particular store, to a particular ballpark, etc. with his/her cell phone. Most of the locations reported for the cell phone may then be associated with one of the frequently visited places. The method of the present disclosure may then further reduce the processing required in real time by taking advantage of the knowledge gained as to frequently visited locations of the user.

In one embodiment, the method of the present disclosure pre-associates each user endpoint device with one or more geo-fences. For example, if a particular user endpoint device is frequently located within a pre-determined list of geo-fences, the method pre-associates the particular user endpoint device with the pre-determined list of geo-fences.

The real time processing may then be performed by first looking up the list of geo-fences that are pre-associated with the user endpoint device. In one embodiment, the method of the present disclosure looks up the list of geo-fences that are pre-associated with the user endpoint device using a mobile identification, e.g., an index of International Mobile Subscriber Identities (IMSIs).

The method then defines one or more triggers for collision and one or more actions that may be taken when a trigger is triggered. For example, a trigger for a collision may be based on meeting two conditions.

For example, a collision may occur for a location that is received for the user, when the location is such that:
 (i) the user endpoint device is in one or more of the geo-fences that are pre-associated with the user endpoint device; and
 (ii) the location is such that the user endpoint device is in a particular bin, wherein the probabilities of being in one or more geo-fences are computed and stored for the particular bin, for each applicable error code.

Then, when a location is received, the method identifies the bin (e.g., MGRS bin) for the location. The method then obtains from the database a first list of geo-fences associated with the bin that is identified. Similarly, the method obtains from the database, using the mobile identification, a second list of geo-fences that is pre-associated with the user endpoint device. The method then determines the intersection of the first geo-fence (e.g., taken from the list associated with the bin) and the second geo-fence (e.g., taken from the pre-associated list).

The method may then perform the look-up to identify the applicable probabilities in a shorter time. The look up for the applicable probabilities is performed based on the error code.

Figure 3:
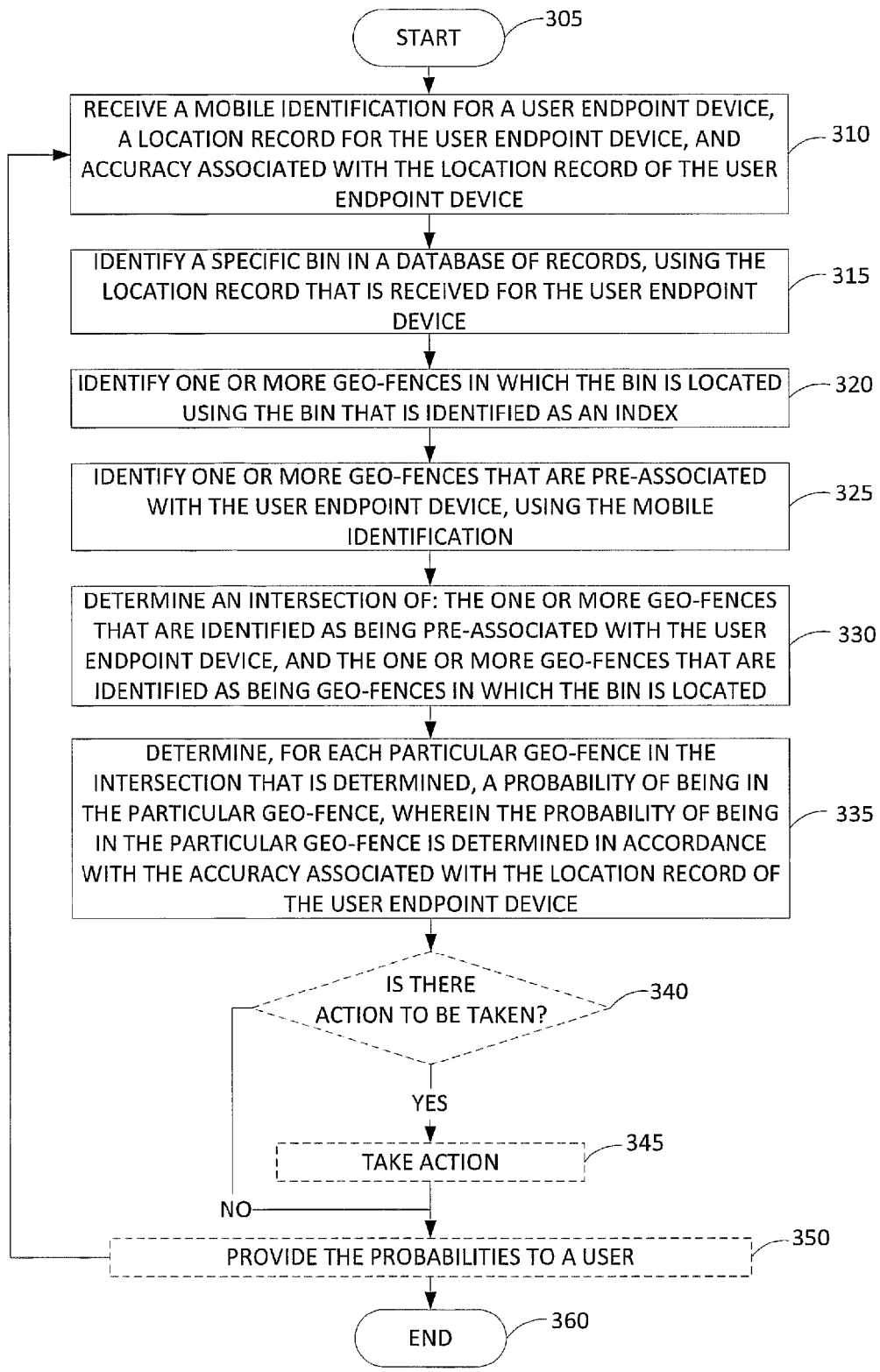
FIG. 3. illustrates a flowchart of a method for providing a probabilistic determination of geo-fence collision in a wireless network.

FIG. 3. illustrates a flowchart of a method 300 for providing a probabilistic determination of geo-fence collision, in real time, in a wireless network. In one embodiment, the method may be implemented in a server, e.g., an application server 106 or a general purpose computer as described in FIG. 4. Method 300 starts in step 305 and proceeds to step 310.

In step 310, method 300 receives a mobile identification for a user endpoint device, a location record for the user endpoint device, and accuracy (error code) associated with the location record of the user endpoint device. For example, the method may receive an IMSI of a cell phone, a location record (e.g., comprising a latitudinal and longitudinal coordinate of the cell phone), and an accuracy level or parameter, e.g., 200 m.

In step 315, method 300 identifies a specific bin in a database of record, using the location record that is received for the user endpoint device, e.g., the latitudinal and longitudinal coordinate received for the user endpoint device.

In step 320, method 300 identifies one or more geo-fences in which the bin is located using the bin that is identified as an index. For example, the method may look up in a database any number of geo-fences in which the particular bin is located. For the example described above, the method would identify the first geo-fence encompassing the business location, the second geo-fence encompassing the neighborhood, the third geo-fence encompassing the township, the fourth geo-fence encompassing a state, and the fifth geo-fence encompassing a country and so on. Since the bin is in the first through the fifth geo-fences, the user endpoint device from which the location is received is also in the first through the fifth geo-fences.

In step 325, method 300 identifies one or more geo-fences that are pre-associated with the user endpoint device, using the mobile identification. For example, the method may determine the first geo-fence is pre-associated with the user endpoint device.

In step 330, method 300 determines an intersection of: the one or more geo-fences that are identified as being pre-associated with the user endpoint device, and the one or more geo-fences that are identified as being geo-fences in which the bin is located. For the example described above, the first geo-fence is identified as being the only geo-fence that is an element of an intersection of the geo-fences that are pre-associated with the user endpoint device, and the geo-fences in which the bin is located.

In step 335, method 300 determines, for each particular geo-fence in the intersection that is determined, a probability of being in the particular geo-fence, wherein the probability of being in the particular geo-fence is determined in accordance with the accuracy level associated with the location record of the user endpoint device. The determining of the probabilities may be performed by looking up in a database populated by computing the probabilities via method 200, as described above. For the example described above, the method determines the probability of being in the first geo-fence for the accuracy of 200 m.

In optional step 340, method 300 determines if there is an action to be taken. For example, the method may notify operations personnel if the probability of being in the geo-fence is below a threshold. If there is no action to be taken, the method proceeds to step 350. Otherwise, the method proceeds to step 345.

In optional step 345, method 300 takes the action or recommends an action to be taken. For example, the method may notify the operations personnel to take a particular action. For example, the operations personnel may then initiate certain operations, maintenance, provisioning, network upgrade functions. The method then proceeds to step 350.

In optional step 350, method 300 provides the probabilities to a user. For example, the service provider may have users, e.g., network operations staff, responsible with ascertaining the reliability of a determination of a location of a customer, e.g., a customer accessing services via the user endpoint point device for which the location is being determined and the geo-fence in which the user endpoint device is located is being ascertained. In one embodiment, the probabilities may also be provided directly to the customer. The method then either proceeds to step 360 to end the present method for providing a probabilistic determination of geo-fence collision or to step 310 to continue receiving location records of user endpoint devices.

In one embodiment, the probabilities determined using method 300, are used to determine confidence intervals as to a claimed location. For example, the service provider may communicate with a customer and provide a confidence interval indicating how certain the location determination is, when the service provider claims that the customer's user endpoint device is located at a particular latitudinal and longitudinal coordinate. For example, the service provider may assert that the location is accurate with 95% certainty that the user is currently within a particular geo-fence. This granularity of probability information (confidence information) is more useful to the user instead of simply declaring to the user that he or she is within a particular geo-fence. As the user approaches the edge of the geo-fence, the user will be provided with a ever decreasing level of confidence, thereby alerting the user that he or she is approaching the edge of the geo-fence.

In one embodiment, the confidence intervals may be used to provide different levels of service to the customer. For example, when the confidence level is high, a higher priced service may be offered to the customer. If the confidence level is below a pre-determined threshold, the service provider may offer only a lower priced service. In other words, the location service can be priced in a manner that is based on how accurate the location information will be.

Although, the present disclosure is described for a scenario in which a user endpoint device is located in a bin, wherein the bin may be located in any number of geo-fences, the method of the present disclosure may be used for other applications. For example, the geo-fences may be expanded to include other attributes. This extension may then be presented in terms of a geo-object, rather than a geo-fence. For example, a geo-object may comprise one or more of: a geo-fence, one or more pre-defined triggers, one or more pre-defined actions to be taken when a trigger condition is satisfied, and a set of objects to which the geo-object applies.

Moreover, the method of the present disclosure is independent of a shape of a geo-fence. For example, a geo-fence may be defined with missing areas in the middle. For instance, if a user endpoint device cannot be located within a particular area located within the boundary of the geo-fence, the particular area may simply be ignored by not computing the probability for the particular area. Hence, complex polygons may be defined and the probabilities may be computed at the same speed as those of the rectangular shaped geo-fences. In addition, the lookup process is the same, regardless of how many geo-fences are defined.

Figure 4:
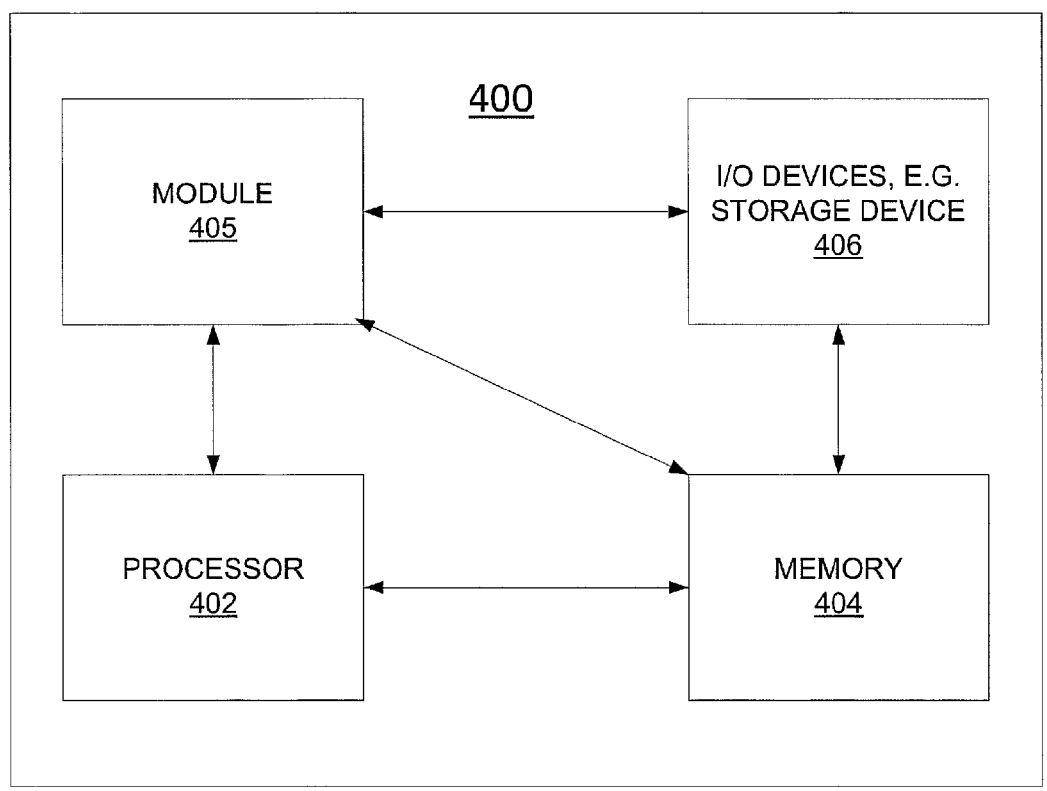
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises one or more hardware processor elements 402 (e.g., a central processing unit (CPU), a microprocessor, or a multi-core processor), a memory 404, e.g., random access memory (RAM) and/or read only memory (ROM), a module 405 for providing a probabilistic determination of geo-fence collision in a wireless network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for providing a probabilistic determination of geo-fence collision in a wireless network (e.g., a software program comprising computer-executable instructions) can be loaded into memory 404 and executed by hardware processor element 402 to implement the steps, functions or operations as discussed above in connection with the exemplary methods 200 and 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for providing a probabilistic determination of geo-fence collision in a wireless network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method for determining a probability for a particular geo-fence in a wireless network, the method comprising:
   receiving, via a processor, a mobile identification for a mobile user endpoint device, a location record for the mobile user endpoint device, and an accuracy level associated with the location record of the mobile user endpoint device;
   identifying, via the processor, a bin in a database of record, using the location record that is received for the mobile user endpoint device;
   identifying, via the processor, one or more geo-fences in which the bin is located;
   identifying, via the processor, one or more geo-fences that are pre-associated with the mobile user endpoint device, using the mobile identification;
   determining, via the processor, an intersection of: the one or more geo-fences that are identified as being pre-associated with the user endpoint device, and the one or more geo-fences that are identified as being geo-fences in which the bin is located; and
   determining, via the processor, for each particular geo-fence in the intersection that is determined, the probability of being in the particular geo-fence, wherein the probability of being in the particular geo-fence is determined in accordance with the accuracy level associated with the location record of the mobile user endpoint device.

2. The method of claim 1, further comprising:
   providing to a user, for each particular geo-fence in the intersection that is determined, the probability of being in the particular geo-fence.

3. The method of claim 1, further comprising:
   recommending an action to be taken when the probability of being in the particular geo-fence is below a predetermined threshold, wherein the action comprises notifying an operations personnel.

4. The method of claim 1, wherein the location record that is received for the mobile user endpoint device comprises a latitudinal and a longitudinal coordinate of the mobile user endpoint device.

5. The method of claim 1, wherein the mobile identification comprises an international mobile subscriber identity of the mobile user endpoint device.

6. The method of claim 1, wherein the probability of being in the particular geo-fence is determined by retrieving from the database in accordance with the accuracy level associated with the location record of the mobile user endpoint device.

7. The method of claim 6, wherein the retrieving from the database is performed in near real time, wherein the probability of being in the particular geo-fence is pre-computed and stored in the database.

8. A computer-readable storage device storing a plurality of instructions which, when executed by a processor, cause the processor to perform operations for determining a probability for a particular geo-fence in a wireless network, the operations comprising:
   receiving a mobile identification for a mobile user endpoint device, a location record for the mobile user endpoint device, and an accuracy level associated with the location record of the mobile user endpoint device;

identifying a bin in a database of record, using the location record that is received for the mobile user endpoint device;

identifying one or more geo-fences in which the bin is located;

identifying one or more geo-fences that are pre-associated with the mobile user endpoint device, using the mobile identification;

determining an intersection of: the one or more geo-fences that are identified as being pre-associated with the user endpoint device, and the one or more geo-fences that are identified as being geo-fences in which the bin is located; and determining for each particular geo-fence in the intersection that is determined, the probability of being in the particular geo-fence, wherein the probability of being in the particular geo-fence is determined in accordance with the accuracy level associated with the location record of the mobile user endpoint device.

9. The computer-readable storage device of claim 8, further comprising:
providing to a user, for each particular geo-fence in the intersection that is determined, the probability of being in the particular geo-fence.

10. The computer-readable storage device of claim 8, further comprising:
recommending an action to be taken when the probability of being in the particular geo-fence is below a predetermined threshold, wherein the action comprises notifying an operations personnel.

11. The computer-readable storage device of claim 8, wherein the location record that is received for the mobile user endpoint device comprises a latitudinal and a longitudinal coordinate of the mobile user endpoint device.

12. The computer-readable storage device of claim 8, wherein the mobile identification comprises an international mobile subscriber identity of the mobile user endpoint device.

13. The computer-readable storage device of claim 8, wherein the probability of being in the particular geo-fence is determined by retrieving from the database in accordance with the accuracy level associated with the location record of the mobile user endpoint device.

14. The computer-readable storage device of claim 13, wherein the retrieving from the database is performed in near real time, wherein the probability of being in the particular geo-fence is pre-computed and stored in the database.

15. An apparatus for determining a probability for a particular geo-fence in a wireless network, the apparatus comprising:

a processor; and a computer-readable storage device storing a plurality of instructions which, when executed by the processor, cause the processor to perform operations, the operations comprising:

receiving a mobile identification for a mobile user endpoint device, a location record for the mobile user endpoint device, and an accuracy level associated with the location record of the mobile user endpoint device;

identifying a bin in a database of record, using the location record that is received for the mobile user endpoint device;

identifying one or more geo-fences in which the bin is located;

identifying one or more geo-fences that are pre-associated with the mobile user endpoint device, using the mobile identification;

determining an intersection of: the one or more geo-fences that are identified as being pre-associated with the user endpoint device, and the one or more geo-fences that are identified as being geo-fences in which the bin is located; and determining for each particular geo-fence in the intersection that is determined, the probability of being in the particular geo-fence, wherein the probability of being in the particular geo-fence is determined in accordance with the accuracy level associated with the location record of the mobile user endpoint device.

16. The apparatus of claim 15, further comprising:
providing to a user, for each particular geo-fence in the intersection that is determined, the probability of being in the particular geo-fence.

17. The apparatus of claim 15, further comprising:
recommending an action to be taken when the probability of being in the particular geo-fence is below a predetermined threshold, wherein the action comprises notifying an operations personnel.

18. The apparatus of claim 15, wherein the location record that is received for the mobile user endpoint device comprises a latitudinal and a longitudinal coordinate of the mobile user endpoint device.

19. The apparatus of claim 15, wherein the mobile identification comprises an international mobile subscriber identity of the mobile user endpoint device.

20. The apparatus of claim 15, wherein the probability of being in the particular geo-fence is determined by retrieving from the database in accordance with the accuracy level associated with the location record of the mobile user endpoint device.

* * * * *